Feb. 24, 1931.  B. S. SIERER  1,794,326
BIN HOPPER
Filed July 20, 1928   2 Sheets-Sheet 1
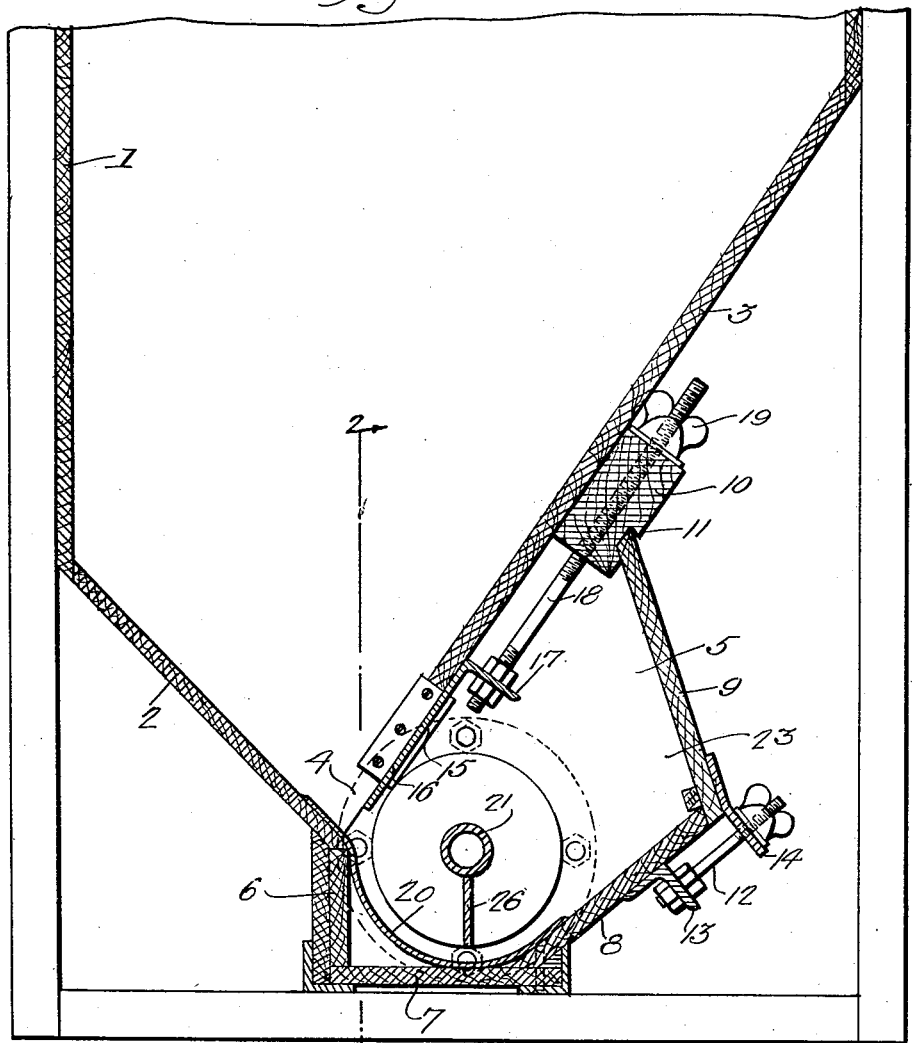
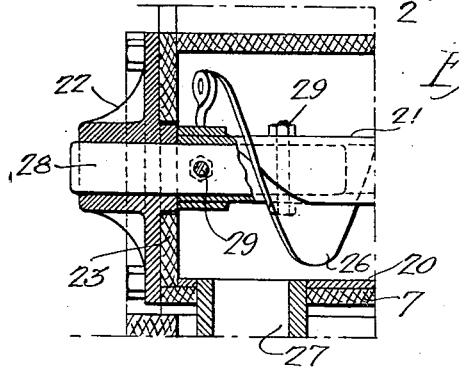
Inventor,
Bert S. Sierer,
by his Attorneys,
Howson & Howson

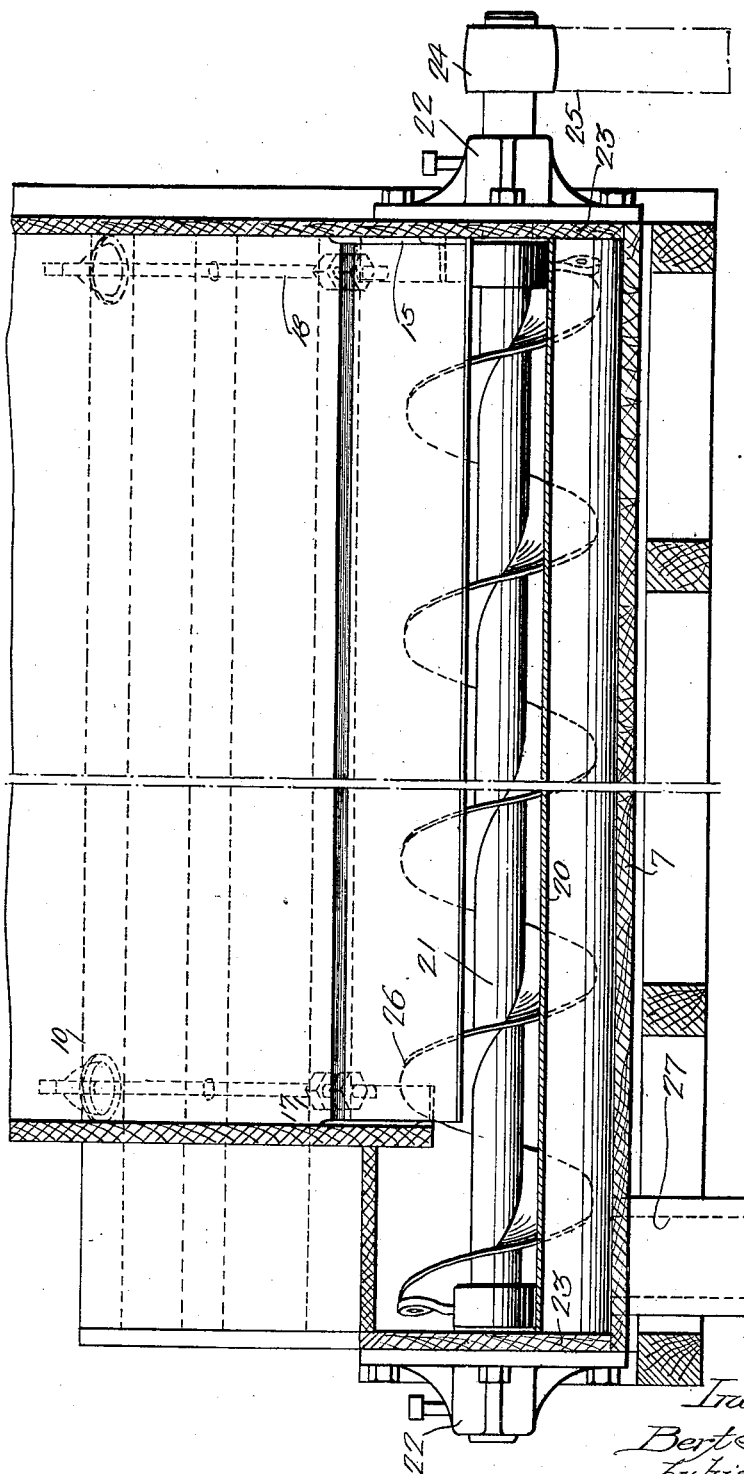

Patented Feb. 24, 1931

1,794,326

UNITED STATES PATENT OFFICE

BERT S. SIERER, OF PHILADELPHIA, PENNSYLVANIA, ASSIGNOR TO M. N. HARTZ, OF BYWOOD, PENNSYLVANIA, DOING BUSINESS AS HARTZ MACHINERY COMPANY, OF PHILADELPHIA, PENNSYLVANIA

BIN HOPPER

Application filed July 20, 1928. Serial No. 294,171.

This invention relates to improvements in bin hoppers, and more particularly to hoppers used in conjunction with bins for flour and similar material.

It has been customary in the past to construct these bins with the hopper arranged centrally between the bottom edges of the lower inclined sides of the bin, the weight of the flour or other material in the hopper thereby falling directly upon the hopper conveyer, which usually takes the form of a rotary screw or helix, which feeds the material longitudinally to an outlet in the bottom and at one end of the hopper. With this type of hopper, it frequently occurs that the flour accumulates and packs hard around the conveyer element, thereby resulting in damage to the conveyer or preventing its operation, and under such circumstances, it is necessary to remove the material from the bin before access can be had to the conveyer for repairs.

It is one of the objects of the present invention, therefore, to so construct the hopper with respect to the bin that the weight of the material in the bin does not fall directly upon the conveyer.

Another object of the invention is to provide a construction as set forth above in which the flow of the flour from the bin to the hopper may be regulated as desired, thereby maintaining a maximum efficiency in the operation of the apparatus as a whole, regardless of the type of material or the kind of flour held in the bin.

A still further object of the invention is to so construct the hopper with respect to the bin that access is afforded to the hopper conveyer without necessitating the removal of the material from the bin.

The invention further contemplates the provision of a novel form of bin and hopper in which communication between the bin and the hopper may be broken and in which provision is made for withdrawing the conveyer from the hopper for repairs or replacement.

The invention further contemplates a novel form of bin hopper in which provision is made for removing the conveyer transversely whereby the space required in the normal operation or use of the hopper is materially reduced, as hereinafter set forth.

In the attached drawings:

Figure 1 is a transverse sectional view of a bin including a hopper made in accordance with the present invention;

Fig. 2 is a section on the line 2—2, Fig. 1, and

Fig. 3 is a fragmentary sectional view taken at one end of the hopper to show the details of the conveyer mounting.

Referring to the drawings, the apparatus comprises a bin 1 which at the bottom is formed with converging walls 2 and 3, the wall 3 stopping short of the lower edge of the wall 2 to provide a longitudinal opening 4 through which the material in the bin may pass to a hopper 5, which hopper is offset transversely with respect to the discharge opening 4, as clearly illustrated in Fig. 1. The hopper comprises in the present instance a vertical wall 6 extending downwardly from the lower edge of the wall 2 of the bin, a horizontal base 7, and extending from the outer edge of the wall 7 and outwardly and upwardly inclined side wall 8. From the upper edge of this wall 8 a detachable cover member 9 extends to a longitudinal member 10 secured to the outer or under face of the wall 3. The upper edge of this cover member 9 in the present instance fits in a slot 11 in the member 10 and is clamped in position at its lower edge by means of bolts 12 which are secured in a flange 13 on the member 8 and which project upwardly through a projecting flange 14 on the lower edge of the cover 9, as shown in Fig. 1.

At the lower edge of the wall 3 of the bin is a longitudinal guide plate 15 which supports and guides a slidable closure member 16, this member projecting downwardly beyond the lower edge of the wall 3 and being adapted for adjustment to either entirely close off the discharge opening 4 at the bottom of the bin or to regulate the amount of opening of this port as required. The closure 16 in the present instance has an outwardly projecting flange 17 in which is secured bolts 18 which extend upwardly through the member 10 and are provided at the upper ends with wing nuts 19 by means of which the bolts may be pulled up together with the closure member 16 to open or enlarge the port 4, and may be released to permit the closure to move downwardly into a port-closing or restricting position.

In the bottom of the hopper 5 and extending from the lower edge of the bin discharge port 4 is a concaved base plate 20 formed on the arc of a circle whose center is the axis of a shaft 21 journaled in bearings 22 secured to the outer faces of the end walls 23 of the hopper, see Fig. 2, and extending at one end beyond the bearing to provide for connection through a pulley 24 on the said projecting end and a belt 25, indicated in broken lines in Fig. 2, with a suitable source of power. The shaft 21 carries a fin or vane 26 in the form of a helix which, when the shaft 21 is rotated, functions to feed the material which has passed into the hopper from the bin longitudinally of the hopper to a discharge port 27 located at one end of the hopper which, as shown in Fig. 2, is extended beyond the end of the bin so that the said discharge port may not lie directly beneath the port 4.

As shown in Fig. 3, the shaft 21 is hollow, and solid extensions 28 are detachably secured by bolts 29 in the ends and extend into the bearings 22 to constitute the journals of the conveyer. By releasing and withdrawing these extensions 28 through the bearings, the conveyer may be withdrawn bodily through the top of the hopper.

The offset hopper construction described above is particularly desirable where the bins are used in handling flour. By reason of the position of the conveyer, it will be apparent that it is substantially free from the weight of the material in the bin, the latter sliding down the wall 2 and through the port 4 into the hopper in quantities determined by the position of the closure element 16. By means of this adjustable closure, the opening 4 may be regulated in accordance with the character of the flour in the bin. The physical characteristics of various kinds of flour vary widely, and the port 4 may be adjusted as to size to afford a maximum efficiency in moving the flour from the bin to the hopper discharge port 27. When repairs are necessary to the hopper conveyer, the closure member 16 may be used to entirely close the port 4, whereby after removing the hopper closure 9, free access is afforded to the conveyer which, if necessary, may be entirely withdrawn from the hopper as described above. Heretofore, where removal of the conveyer was necessary, it has been necessary to draw the conveyer longitudinally through one end of the hopper, this making necessary the provision of a space at least as long again as the hopper through which the conveyer might be withdrawn or inserted. In the present instance, the bins may be placed in close end to end relation without interfering with the removal of the conveyer.

It will be apparent that there may be material modification in the details of the bin and hopper herein disclosed without departure from the essential features of the invention.

I claim:

1. A bin hopper having a bottom discharge opening located at one side thereof, a hopper underlying said opening, a worm conveyor in the hopper and transversely displaced from the opening, a detachable cover for the hopper, bearings carried by the ends of the hopper and trunnions rotatable in the bearings and detachably engaged with the worm conveyor.

2. A bin hopper having a bottom discharge opening located at one side thereof, a hopper underlying said opening, a worm conveyor in the hopper and transversely displaced from the opening, said conveyor being of less length than the hopper, bearings carried by the hopper ends and detachable extensions for the conveyor engaging in said bearings.

BERT S. SIERER.